Patented June 1, 1948

2,442,653

UNITED STATES PATENT OFFICE 2,442,653

INSECTICIDES

Theodore W. Kerr, Jr., Kingston, R. I., and Walter D. Harris, Naugatuck, Conn., assignors to United States Rubber Company, New York, N. Y., a corporation of New Jersey No Drawing. Application December 10, 1946, Serial No. 715,336

10 Claims. (Cl. 167—30)

This invention relates to improvements in insecticides. The term "insecticide" is considered to include larvaecides, arachnicides, and insect repellents or insectifuges, and is to be construed in accordance with the Insecticide Act of 1910, Section 6.

We have discovered that mixtures of 2,2-bis(p-chlorophenyl)-1,1,1-trichloroethane with alkyl naphthyl ethers exhibit a synergistic insecticidal action. The insecticidal action of the 2,2-bis(p-chlorophenyl)-1,1,1-trichloroethane is disclosed in United States patent to Müller No. 2,329,074, reissued as Re. 22,700.

The alkyl naphthyl ethers may be the 1-naphthyl ethers

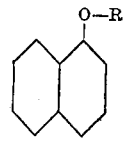

or the 2-naphthyl ethers

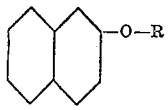

in which R is an alkyl radical. For economic reasons the alkyl 2-naphthyl ethers are preferred. We have demonstrated the synergistic insecticidal action of mixtures of 2,2-bis(p-chlorophenyl)-1,1,1-trichloroethane with alkyl naphthyl ethers having 2 to 5 carbon atoms in the alkyl radical, namely, the ethyl, propyl, butyl, and amyl naphthyl ethers.

The mixtures of the 2,2-bis(p-chlorophenyl)-1,1,1-trichloroethane and the alkyl naphthyl ethers may be applied to loci to be protected against insects in undiluted form, or as dusts in admixture with powdered solid carriers, such as clay or talc, or as liquids or sprays when in a liquid carrier, as in solution in a suitable mutual solvent, or in suspension in a suitable non-solvent medium, for example, water. In protecting plants (the term including plant parts) which are subject to attack by insects, the mixture of the chemicals may readily be applied in aqueous suspension, preferably containing a dispersing agent.

The following examples, which are illustrative of the invention, clearly show the synergistic insecticidal effect of mixtures of 2,2-bis(p-chlorophenyl)-1,1,1-trichloroethane with alkyl naphthyl ethers. The 2,2-bis(p-chlorophenyl)-1,1,1-trichloroethane used was prepared in the conventional manner by reacting 1 mol of chloral with 2 mols of monochlorobenzene in the presence of an excess of concentrated sulfuric acid. After the reaction had stopped, the mixture was poured into a large amount of water, whereupon the 2,2-bis(p-chlorophenyl)-1,1,1-trichloroethane separated out. It may be washed and recrystallized from alcohol. The preparation of the alkyl naphthyl ethers is well known in the art.

The effectiveness of 2,2-bis(p-chlorophenyl)-1,1,1-trichloroethane, ethyl 1-naphthyl ether, n-amyl 2-naphthyl ether, and mixtures of the 2,2-bis(p-chlorophenyl)-1,1,1-trichloroethane with the ethyl 1-naphthyl ether, and with the n-amyl 2-naphthyl ether, was tested against the Mexican bean beetle, Epilachna varivestis, by spraying bean leaves with aqueous dispersions of the chemicals containing a small amount of a commercial glycol condensate, believed to be the reaction product of ethylene oxide and castor oil, and with mixtures of the dispersions of the chemicals. The bean leaves were infested with 40 Mexican beetles, after spraying, and were placed in separate covered petri dishes. Observations as to mortality of the beetles were made after forty-eight hours. The percentage mortality of the Mexican bean beetles on untreated leaves was 0.0%, on leaves treated with 1–533 dilution of ethyl-1-naphthyl ether was 0.0%, on leaves treated with 1–533 dilution of n-amyl 2-naphthyl ether was 37.5%, and on leaves treated with 1–1600 dilution of 2,2-bis(p-chlorophenyl)-1,1,1-trichloroethane was 0.0%. A mixture of 1–533 dilution of ethyl 1-naphthyl ether and 1–1600 dilution of 2,2-bis(p-chlorophenyl)-1,1,1-trichloroethane gave 27.5% mortality of the beetles, and a mixture of 1–533 dilution of n-amyl 2-naphthyl ether and 1–1600 dilution of 2,2-bis(p-chlorophenyl)-1,1,1-trichloroethane gave 100% mortality of the beetles.

The effectiveness of 2,2-bis(p-chlorophenyl)-1,1,1-trichloroethane, n-butyl 2-naphthyl ether, isobutyl 2-naphthyl ether, n-propyl 2-naphthyl ether and mixtures of the 2,2-bis(p-chlorophenyl)-1,1,1-trichloroethane with each of these ethers were demonstrated against the pea aphid, Macrosiphum pisi by spraying broad bean leaves infested with a number (usually about 40) of pea aphids with aqueous dispersions of the chemicals containing a small amount of a commercial glycol condensate, believed to be the reaction product of ethylene oxide and castor oil, and with mixtures of the dispersions of the chemicals. After spraying, the leaves were placed in separate covered petri dishes. Observations as to mortality of the pea aphids were made after twenty-four hours. The percentage mortality of the pea aphids on leaves treated with 1-1066 dilution of n-butyl 2-naphthyl ether was 33.5%, on leaves treated with 1-1066 dilution of iso-butyl 2-naphthyl ether was 57.3%, on leaves treated with 1-1066 dilution of n-propyl 2-naphthyl ether was 32.5%, and on leaves treated with 1-3200 dilution of 2-2-bis(p-chlorophenyl)-1,1,1-trichloroethane was 24.2%. A mixture of 1-1066 dilution of n-butyl 2-naphthyl ether and 1-3200 dilution of 2,2-bis(p-chlorophenyl)-1,1,1-trichloroethane gave 68.0% mortality of the pea aphids, a mixture of 1066 dilution isobutyl 2-naphthyl ether and 1-3200 dilution of 2,2-bis(p-chlorophenyl)-1,1,1-trichloroethane gave 87.1% mortality of pea aphids, and a mixture of 1-1066 dilution of n-propyl 2-naphthyl ether and 1-3200 dilution of 2,2-bis(p-chlorophenyl)-1,1,1-trichloroethane gave 75.6% mortality of pea aphids.

The effectiveness of 2,2-bis(p-chlorophenyl)-1,1,1-trichloroethane, and mixtures of n-propyl, n-butyl and isobutyl naphthyl ethers, and the synergistic action of a combination of 2,2-bis(p-chloropheny)-1,1,1-trichloroethane with such mixtures of n-propyl, n-butyl and isobutyl napthyl ethers were demonstrated against the pea aphid, *Macrosiphum pisi* by spraying broad bean leaves infested with a number (usually about 40) pea aphids with aqueous dispersions of the chemicals containing a small amount of a commercial glycol condensate, believed to be the reaction product of ethylene oxide and castor oil. After spraying, the leaves were placed in separate covered petri dishes. Observations as to mortality of the pea aphids were made after twenty-four hours. In one series of tests, the percentage mortality of the pea aphids on leaves treated with a 1-6400 dilution of 2,2-bis(p-chlorophenyl)-1,1,1-trichloroethane was 24.2%, and on leaves treated with a 1-2055 dilution of a mixed propyl and butyl naphthyl ethers (60% by weight n-butyl 2-naphthyl ether, 20% by weight isobutyl 2-naphthyl ether, and 20% by weight n-propyl 2-naphthyl ether) was 8.6%. A mixture of 1-6400 dilution of 2,2-bis(p-chlorophenyl)-1,1,1-trichloroethane and 1-2055 dilution of the same mixed propyl and butyl naphthyl ethers gave 76.9% mortality of pea aphids. In another series of tests, the percentage mortality of the pea aphids on leaves treated with 1-5333 dilution of 2,2-bis(p-chlorophenyl)-1,1,1-trichloroethane was 6.8%, and on leaves treated with a 1-6162 dilution of a mixed propyl and butyl naphthyl ethers (60% by weight isobutyl 2-naphthyl ether, 20% by weight n-butyl 2-naphthyl ether, and 20% by weight n-propyl 2-naphthyl ether) was 25.0%. A mixture of 1-5333 dilution of 2,2-bis(p-chlorophenyl)-1,1,1-trichloroethane and 1-6162 dilution of this second mixed propyl and butyl naphthyl ethers gave 54.1% mortality of the pea aphids.

The synergistic insecticidal action of compositions containing 2,2-bis(p-chlorophenyl)-1,1,1-trichloroethane and alkyl naphthyl ethers is clearly demonstrated by the much greater total effect of the mixture than the sum of the two effects taken independently.

This application is a continuation-in-part of application Serial No. 600,410, filed June 19, 1945.

Having thus described our invention, what we claim and desire to protect by Letters Patent is:

1. An insecticidal composition containing 2,2-bis(p-chlorophenyl) - 1,1,1-trichloroethane and material selected from the group consisting of alkyl naphthyl ethers having 2 to 5 carbon atoms in the alkyl radical.

2. An insecticidal composition containing 2,2-bis(p-chlorophenyl) - 1,1,1-trichloroethane and ethyl 2-naphthyl ether.

3. An insecticidal composition containing 2,2-bis(p-chlorophenyl)-1,1,1-trichloroethane and a propyl 2-naphthyl ether.

4. An insecticidal composition containing 2,2-bis(p-chlorophenyl)-1,1,1-trichloroethane and a butyl 2-naphthyl ether.

5. An insecticidal composition containing 2,2-bis(p-chlorophenyl)-1,1,1-trichloroethane and a mixture of n-propyl 2-naphthyl ether, n-butyl 2-naphthyl ether and isobutyl 2-naphthyl ether.

6. The method which comprises applying to loci to be protected against insects a composition containing 2,2-bis(p-chlorophenyl)-1,1,1-trichlorothane and material selected from the group consisting of alkyl naphthyl ethers having 2 to 5 carbon atoms in the alkyl radical.

7. The method which comprises applying to loci to be protected against insects a composition containing 2,2-bis(p-chlorophenyl)-1,1,1-trichloroethane and ethyl 2-naphthyl ether.

8. The method which comprises applying to loci to be protected against insects a composition containing 2,2-bis(p-chlorophenyl)-1,1,1-trichloroethane and a propyl 2-naphthyl ether.

9. The method which comprises applying to loci to be protected against insects a composition containing 2,2-bis(p-chlorophenyl)-1,1,1-trichloroethane and a butyl 2-naphthyl ether.

10. The method which comprises applying to loci to be protected against insects a composition containing 2,2-bis(p-chlorophenyl)-1,1,1-trichloroethane and a mixture of n-propyl 2-naphthyl ether, n-butyl 2-naphthyl ether and isobutyl 2-naphthyl ether.

THEODORE W. KERR, Jr.
WALTER D. HARRIS.

REFERENCES CITED

The following references are of record in the file of this patent:

UNITED STATES PATENTS

| Number | Name | Date |
|---|---|---|
| Re. 22,700 | Muller | Dec. 4, 1945 |

OTHER REFERENCES

Dictionary of Organic Compounds—Heilbron (1936), volume 2, pages 42 and 770. Copy in Pat. Off. Library.)

Certificate of Correction

Patent No. 2,442,653.

June 1, 1948.

THEODORE W. KERR, JR., ET AL.

It is hereby certified that errors appear in the printed specification of the above numbered patent requiring correction as follows: Column 4, line 21, claim 5, for "insecticidial" read *insecticidal*; line 28, claim 6, for the syllable "rothane" read *roethane*; and that the said Letters Patent should be read with these corrections therein that the same may conform to the record of the case in the Patent Office.

Signed and sealed this 5th day of October, A. D. 1948.

[SEAL]

THOMAS F. MURPHY,
*Assistant Commissioner of Patents.*